(12) United States Patent
Cerce et al.

(10) Patent No.: US 10,041,631 B1
(45) Date of Patent: Aug. 7, 2018

(54) LED BOARD RAIL MOUNTING SYSTEM FOR RETROFITTING FLUORESCENT LIGHT FIXTURES

(71) Applicant: ENERGY PLANNING ASSOCIATES CORP., Sanford, FL (US)

(72) Inventors: Dominick Cerce, Sanford, FL (US); Saturnino Oquendo, Jr., Orlando, FL (US)

(73) Assignee: ENERGY PLANNING ASSOCIATES CORP., Sanford, FL (US)

( * ) Notice: Subject to any disclaimer, the term of this patent is extended or adjusted under 35 U.S.C. 154(b) by 0 days.

(21) Appl. No.: 15/497,967

(22) Filed: Apr. 26, 2017

(51) Int. Cl.
*F21S 4/00* (2016.01)
*F21V 21/00* (2006.01)
*F21K 9/20* (2016.01)
*F21K 9/90* (2016.01)
*F21V 19/00* (2006.01)
*F21V 21/35* (2006.01)
*F21Y 103/10* (2016.01)
*F21Y 115/10* (2016.01)

(52) U.S. Cl.
CPC .................. *F21K 9/20* (2016.08); *F21K 9/90* (2013.01); *F21V 19/003* (2013.01); *F21V 21/35* (2013.01); *F21Y 2103/10* (2016.08); *F21Y 2115/10* (2016.08)

(58) Field of Classification Search
CPC ... F21K 9/20; F21K 9/27; F21K 9/272; F21K 9/90; F21V 19/003; F21V 19/0035; F21V 21/35
USPC .......... 362/217.01–217.17, 218–225, 249.02
See application file for complete search history.

(56) References Cited

U.S. PATENT DOCUMENTS

| | | | |
|---|---|---|---|
| 8,319,433 B2 | 11/2012 | Lin et al. | |
| 9,072,171 B2 | 6/2015 | Simon | |
| 2012/0113628 A1 | 5/2012 | Burrow et al. | |
| 2012/0155073 A1 | 6/2012 | McCanless et al. | |
| 2014/0355272 A1 | 12/2014 | Chou | |

*Primary Examiner* — Jason Moon Han
(74) *Attorney, Agent, or Firm* — Matthew G. McKinney, Esq.; Allen, Dyer et al.

(57) ABSTRACT

An LED board rail for retrofitting an existing fluorescent light fixture includes a planar top surface configured to carry an LED board. The LED board rail includes a first flap connected to the planar top surface along a first fold line of a first side of the planar top surface, and a second flap connected to the planar top surface along a second fold line of a second side of the planar top surface. The LED board rail also includes tapered first and second ends formed in the planar top surface. In addition, the LED board rail includes a first T-shaped fastener folded downward from the tapered first end of the planar top surface, and a second T-shaped fastener folded downward from the tapered second end of the planar top surface and the T-shaped fasteners being configured to engage the fluorescent light fixture.

20 Claims, 4 Drawing Sheets

LED BOARD RAIL MOUNTING SYSTEM FOR RETROFITTING FLUORESCENT LIGHT FIXTURES

TECHNICAL FIELD

The present invention relates to the field of light fixtures, and, more particularly, to an LED board rail mounting system for retrofitting existing fluorescent light fixtures and related methods.

BACKGROUND

The fluorescent light bulbs are used in many commercial applications, particularly for indoor office lighting. The fluorescent light fixtures include a troffer with one or more fluorescent light bulbs, where the fluorescent light bulbs have different sizes. For example, common fluorescent lights for use in indoor lighting include the T5 (⅝ inch diameter), T8 (1 inch diameter), and the T12 (1½ inch diameter). Such fluorescent bulbs are relatively inefficient and have a relatively short life. Thus, efforts have been made to identify suitable alternative illumination sources for indoor office lighting applications. Light emitting diodes ("LEDs") have been identified as one alternative to traditional fluorescent bulbs.

An LED typically includes a diode mounted onto a die or chip. The die is connected to a power source, which, in turn, transmits power to the diode. An LED used for lighting or illumination converts electrical energy to light in a manner that results in little radiant energy outside the visible spectrum.

Efforts have also been made to retrofit fluorescent light fixtures with an LED light fixtures. However, the heat generated by the LED light fixtures may cause problems related to the functions of the LEDs and light fixtures. In particular, the relatively high operating temperatures may degrade the performance of the LED light. For example, typical LED lights have a lifetime of approximately 50,000 hours at room temperature, but can be reduced significantly at higher operating temperatures. Thus, many retrofit LED light fixtures do not provide the anticipated benefits or longer life due to inadequate thermal ventilation and configuration. Therefore, there exists a need for a a system for mounting LED board rails to a fluorescent light fixture that is easy to install.

SUMMARY

In view of the foregoing background, it is therefore an object of the present invention to provide an improved LED board rail mounting system for retrofitting fluorescent light fixtures.

This and other objects, features, and advantages in accordance with the present invention are provided by a light emitting diode (LED) board rail having a planar top surface configured to carry an LED board, a first flap connected to the planar top surface along a first fold line of a first side of the planar top surface, and a second flap connected to the planar top surface along a second fold line of a second side of the planar top surface. The LED board rail also includes a tapered first end formed in the planar top surface, a tapered second end formed in the planar top surface opposite from the tapered first end, a first T-shaped fastener folded downward from the tapered first end of the planar top surface and configured to engage the fluorescent light fixture, and a second T-shaped fastener folded downward from the tapered second end of the planar top surface and configured to engage the fluorescent light fixture.

A method aspect is directed to a method of mounting an LED board rail to a fluorescent light fixture, where the LED board rail has a planar top surface configured to carry an LED board, a first flap connected to the planar top surface along a first fold line of a first side of the planar top surface, a second flap connected to the planar top surface along a second fold line of a second side of the planar top surface, a tapered first end formed in the planar top surface, a tapered second end formed in the planar top surface opposite from the tapered first end, a first T-shaped fastener folded downward from the tapered first end of the planar top surface and configured to engage an underside of the fluorescent light fixture, and a second T-shaped fastener folded downward from the tapered second end of the planar top surface. The method includes bending the first and second T-shaped fasteners downward until a fastener of the fluorescent light fixture is engaged in order to secure the LED board rail to the fluorescent light fixture.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The LED board rail system of the present invention is configured to be anchored into existing linear fluorescent light fixtures using the lamp holder notches cut out in the lamp bracket. The size and location of the notches are dictated by standardized sizes of fluorescent lamps. The LED board rail system of the present invention simulates the combination of the fluorescent lamps and their respective lamp holders. Accordingly, the LED board rail system reduces the need for custom bracketry or mechanical modification to the existing fluorescent fixture during a retrofitting process.

An advantageous aspect of the LED board rail system of the present invention is that leaving the light fixture as-is with no structural modification will most likely lead to easier acceptance by safety and performance regulatory agencies, quicker installation and lower the cost of upgrading the light fixture to the LED technology when compared to other existing retrofitting kits that require modification to the structure of the existing light fixture. The LED board rail system is superior to common LED tubes because they do not require high voltage AC to be passed into the lamp holders. Thus, there is a reduced risk of electrical shock during relamping or potential of accidental confusion between fluorescent and LED replacement lamps.

Fluorescent light tubes such as the T12, T8 and T5 as they are commonly known, are used widely across the industry. Accordingly, there are many fixture styles which could be upgraded with the LED board rail system described herein. In addition, many different embodiments of the LED board rail system are possible to accommodate the different lamp holder styles.

Figure 1:
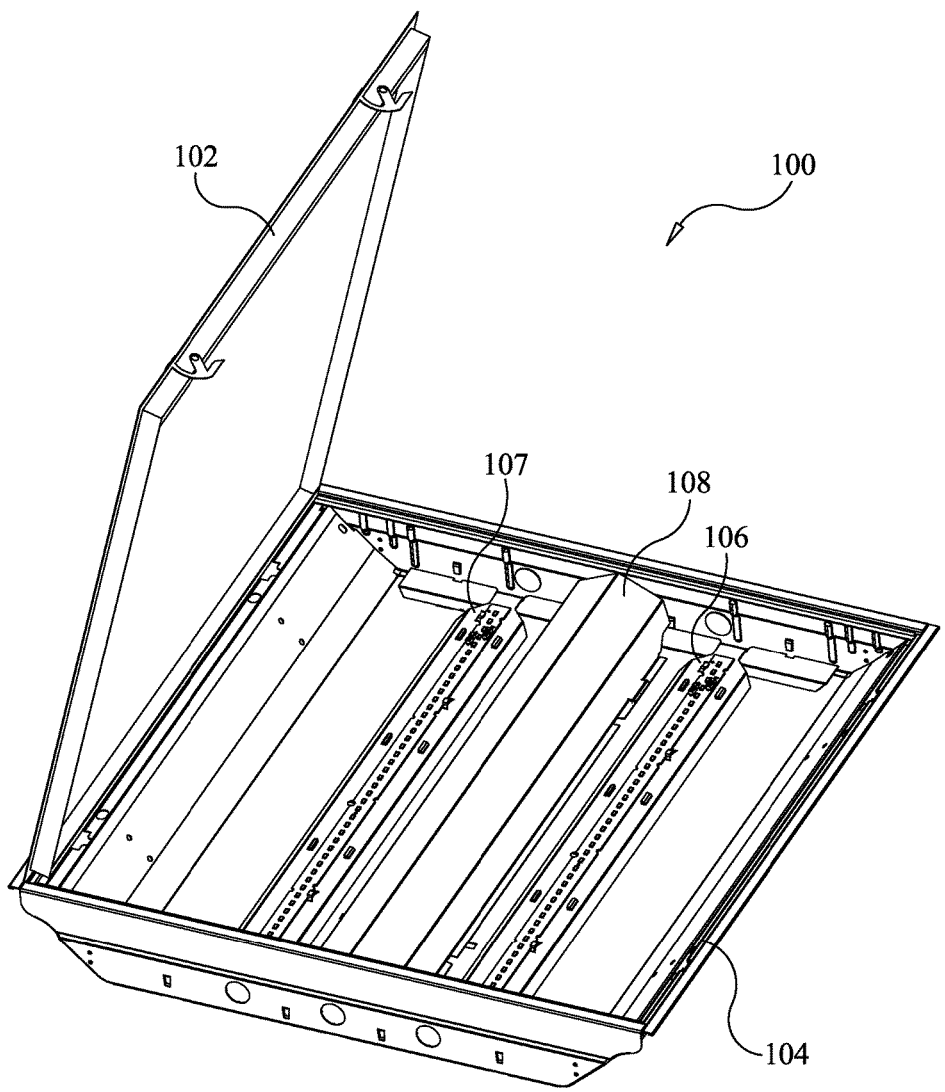
FIG. 1 is a perspective view of a pair of LED board rails mounted to a light fixture in accordance with the invention.

Referring initially to FIG. 1, a light fixture 100 having a LED board rail mounting system is illustrated. The light fixture 100 includes a lens 102 that is removably secured over the bottom casing 104 of the light fixture 100. In this particular illustrative embodiment, a pair of LED board rails 106, 107 are shown installed into the light fixture 100. A reflective divider 108 is located between the LED board rails 106, 107 in this particular embodiment. The lens 102 is configured to swing open and closed over the bottom casing 104 of the light fixture 100. The LED board rails 106, 107 are orientated in the same location that fluorescent bulbs would typically be located.

Figure 2:
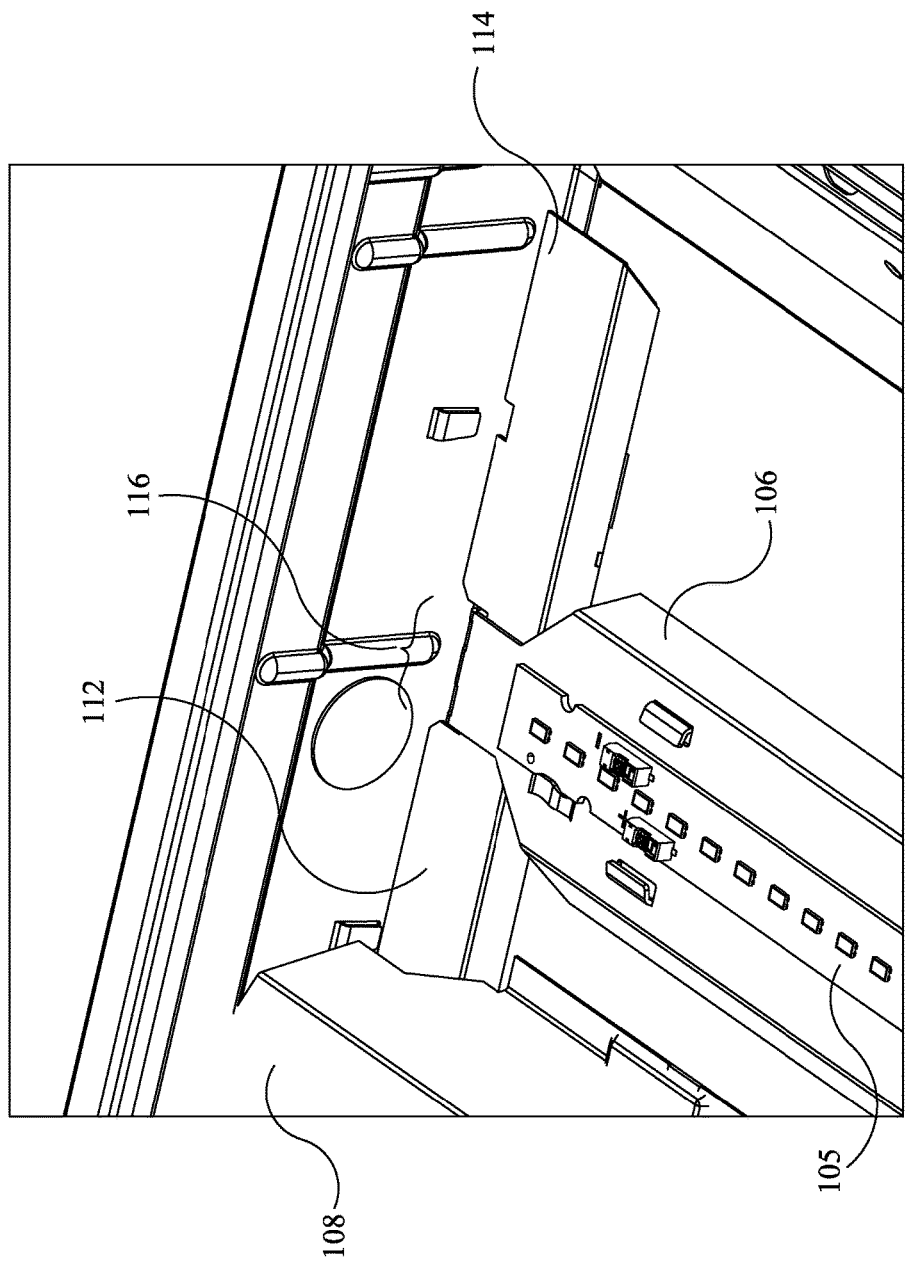
FIG. 2 is a detail view of an end of the LED board rail anchored to a lamp bracket of the light fixture of FIG. 1.

In particular, as shown in FIG. 2 a lamp bracket 112 is on a first side of the LED board rail 106, and a second lamp bracket 114 is on a second side of the LED board rail 106. The lamp brackets 112, 114 are typically used to secure lamp holders (not shown) for a respective fluorescent tube. In this embodiment, the lamp holders (or sockets) have been removed, and the end of the LED board rail 106 has been anchored between the lamp brackets 112, 114 in a notch 116 formed therebetween. An LED board 105 is secured to a planar top surface of the LED board rail 106 and the LED board 105 is used to provide the light that would typically be provided by a fluorescent light tube.

Figure 3:
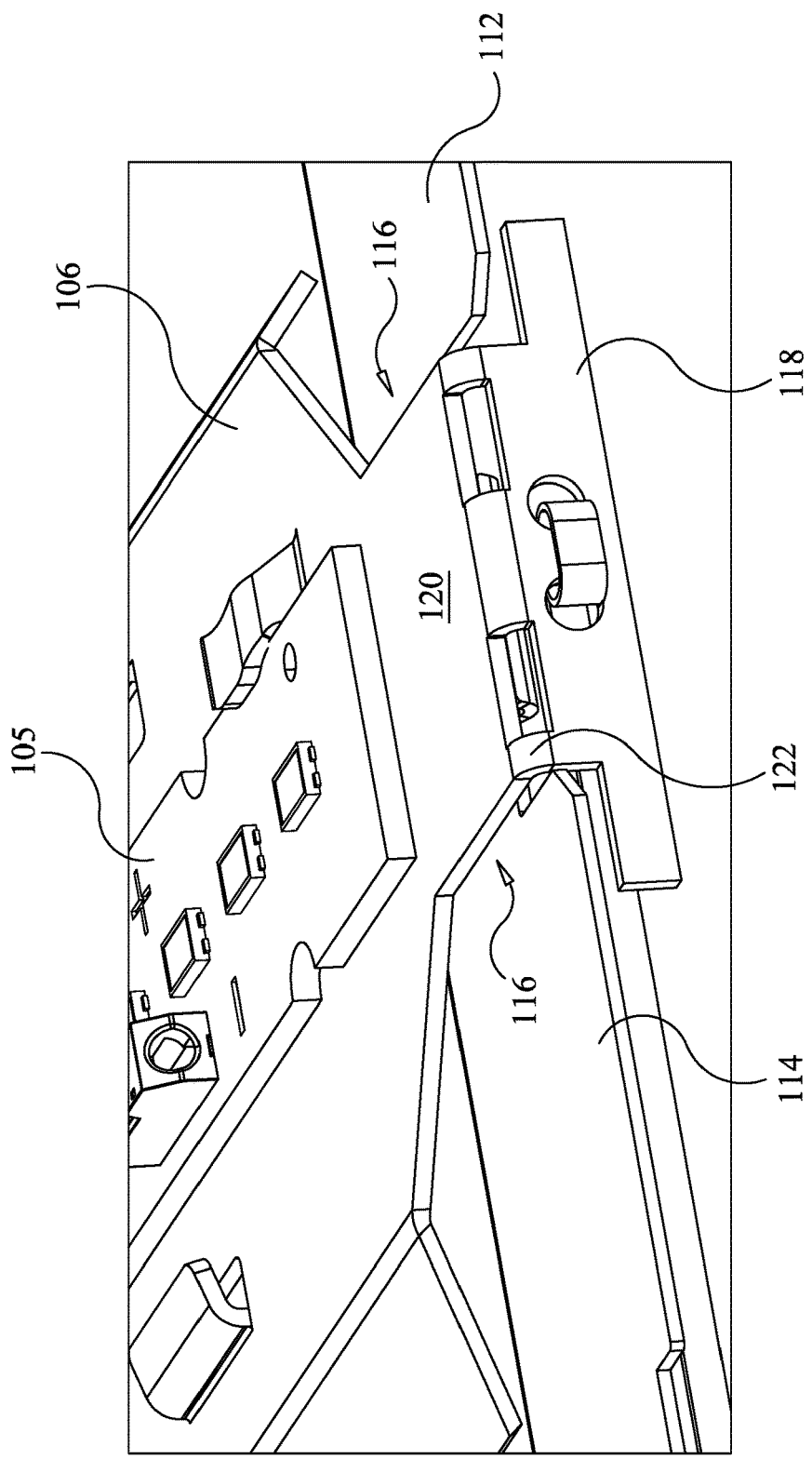
FIG. 3 is a detail view of the end of the LED board rail.

Referring now to FIG. 3, an end of the LED board rail 106 is shown. A tapered first end 120 is formed in the planar top surface of the LED board rail 106, and is configured to fit into, and substantially fill, the lamp bracket notch 116.

Figure 4:
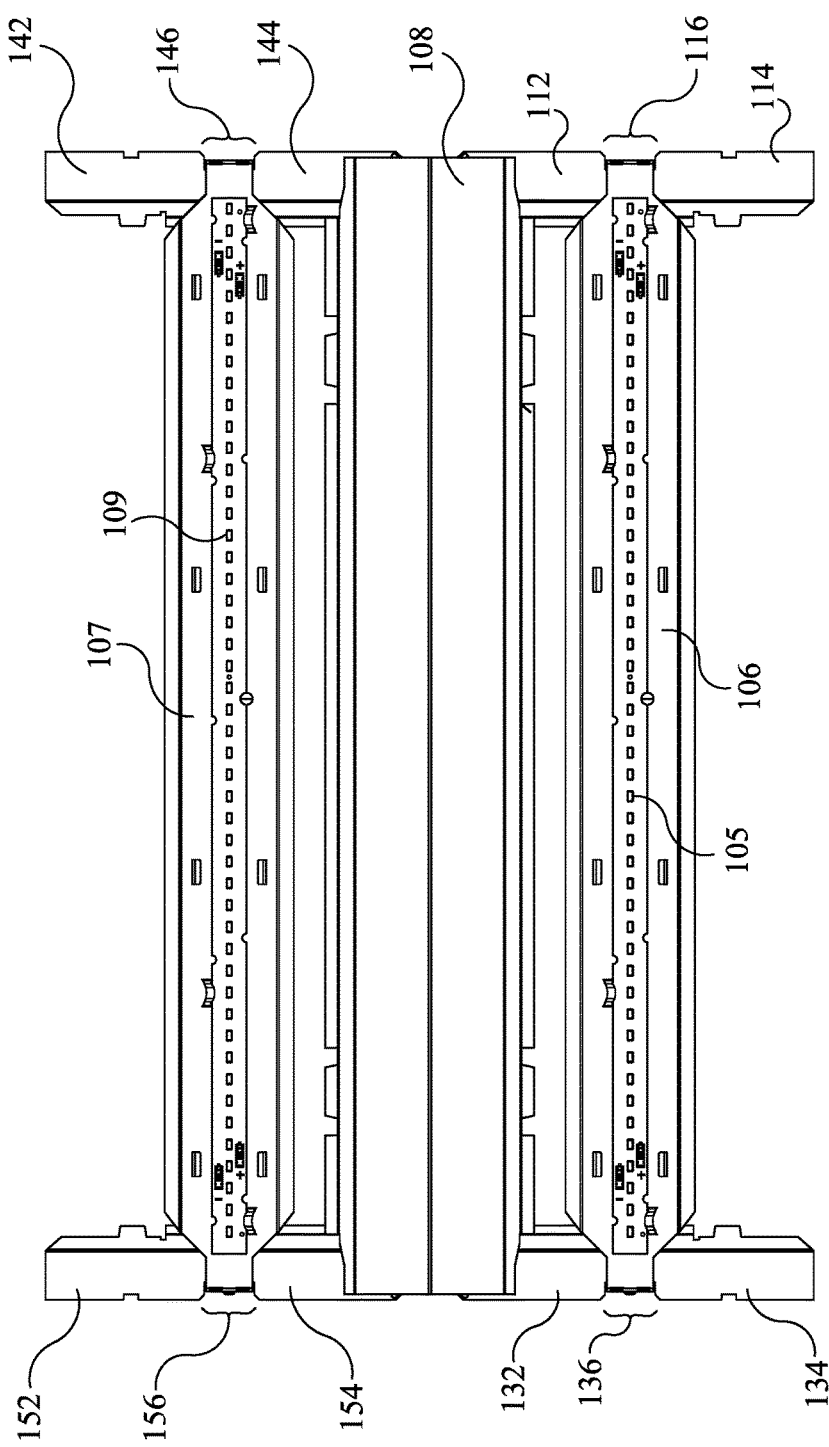
FIG. 4 is a top view of the pair of LED board rails with the body of the light fixture removed for clarity.

Similarly, a tapered second end is formed in the planar top surface opposite from the tapered first end 120 and configured to fit in the respective lamp bracket notch 136, as shown in FIG. 4. A first fastener 118 is configured to be folded downward from the tapered first end 120 of the planar top surface and configured to engage the underside of the lamp brackets 112, 114. In a particular embodiment, the fastener has a T-shape. Similarly, a second fastener is configured to be folded downward from the tapered second end of the planar top surface and configured to engage the underside of the respective lamp brackets 132, 134. Once the LED board rails 106, 107 have been installed, the lens 102 is replaced over the bottom casing 210 and the fluorescent light fixture has been retrofitted to an LED light fixture with LED board rails 106, 107.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An LED board rail for retrofitting an existing fluorescent light fixture, the LED board rail comprising:
   a planar top surface configured to carry an LED board;
   a first flap connected to the planar top surface along a first fold line of a first side of the planar top surface;
   a second flap connected to the planar top surface along a second fold line of a second side of the planar top surface;
   a tapered first end formed in the planar top surface;
   a tapered second end formed in the planar top surface opposite from the tapered first end;
   a first T-shaped fastener folded downward from the tapered first end of the planar top surface and configured to engage the fluorescent light fixture; and
   a second T-shaped fastener folded downward from the tapered second end of the planar top surface and configured to engage the fluorescent light fixture.

2. The LED board rail of claim 1, further comprising an LED board secured to the planar top surface.

3. The LED board rail of claim 1, wherein the first and second T-shaped fasteners each comprise an aperture configured to receive a respective fastener to secure the LED board rail to the fluorescent light fixture.

4. The LED board rail of claim 1, wherein the planar top surface comprises a plurality of alternating bosses configured to secure an LED board to the LED board rail.

5. The LED board rail of claim 1, wherein the planar top surface is elevated from the fluorescent light fixture by the first and second flaps.

6. The LED board rail of claim 1, wherein the LED board rail comprises metal.

7. The LED board rail of claim 1, wherein the LED board rail has a length spanning an entire length of the fluorescent light fixture.

8. The LED board rail of claim 1, wherein the first and second side flaps are angled outwardly from the planar top surface.

9. The LED board rail of claim 1, wherein the tapered first and second ends extend away from the planar top surface.

10. An LED board rail mounting system for retrofitting existing fluorescent light fixtures, the system comprising:
    a fluorescent light fixture frame; and
    an LED board rail comprising
      a planar top surface configured to carry an LED board,
      a first flap connected to the planar top surface along a first fold line of a first side of the planar top surface,
      a second flap connected to the planar top surface along a second fold line of a second side of the planar top surface,
      a tapered first end formed in the planar top surface,
      a tapered second end formed in the planar top surface opposite from the tapered first end,
      a first T-shaped fastener folded downward from the tapered first end of the planar top surface and configured to engage an underside of the fluorescent light fixture, and
      a second T-shaped fastener folded downward from the tapered second end of the planar top surface and configured to engage an underside of the fluorescent light fixture.

11. The LED board rail mounting system of claim 10, further comprising an LED board secured to the planar top surface.

12. The LED board rail mounting system of claim 10, wherein the first and second T-shaped fasteners each comprise an aperture configured to receive a respective fastener to secure the LED board rail to the fluorescent light fixture.

13. The LED board rail mounting system of claim 10, wherein the planar top surface comprises a plurality of alternating bosses configured to secure an LED board to the LED board rail.

14. The LED board rail mounting system of claim 10, wherein the planar top surface is elevated from the fluorescent light fixture by the first and second flaps.

15. The LED board rail mounting system of claim 10, wherein the LED board rail comprises metal.

16. The LED board rail mounting system of claim 10, wherein the LED board rail has a length spanning an entire length of the fluorescent light fixture.

17. The LED board rail mounting system of claim 10, wherein the first and second side flaps are angled outwardly from the planar top surface.

18. The LED board rail mounting system of claim 10, wherein the tapered first and second ends extend away from the planar top surface.

19. A method of mounting an LED board rail to a fluorescent light fixture, the LED board rail comprising a planar top surface configured to carry an LED board, a first flap connected to the planar top surface along a first fold line of a first side of the planar top surface, a second flap connected to the planar top surface along a second fold line of a second side of the planar top surface, a tapered first end formed in the planar top surface, a tapered second end formed in the planar top surface opposite from the tapered first end, a first T-shaped fastener folded downward from the tapered first end of the planar top surface and configured to engage an underside of the fluorescent light fixture, and a second T-shaped fastener folded downward from the tapered second end of the planar top surface, the method comprising:

bending the first and second T-shaped fasteners downward until a fastener of the fluorescent light fixture is engaged in order to secure the LED board rail to the fluorescent light fixture.

20. The method of claim 19, wherein the LED board mounting rail comprises an LED board mounted to the planar top surface.

* * * * *